United States Patent [19]

Niwa et al.

[11] Patent Number: 4,542,207
[45] Date of Patent: Sep. 17, 1985

[54] HETEROCYCLIC MONOAZO DYES FOR POLYESTER FIBERS

[75] Inventors: Toshio Niwa; Kiyoshi Himeno, both of Yokohama; Junji Yoshihara, Sagamihara, all of Japan

[73] Assignee: Research Association Of Synthetic Dyestuffs, Tokyo, Japan

[21] Appl. No.: 482,802

[22] Filed: Apr. 7, 1983

[30] Foreign Application Priority Data

Apr. 15, 1982 [JP] Japan .................................. 57-63041

[51] Int. Cl.⁴ .................... C09B 29/036; C09B 29/042; C09B 29/045; C09B 29/048
[52] U.S. Cl. ...................................... 534/630; 534/640; 534/643; 534/770; 534/774; 534/788; 534/791; 534/794; 534/795
[58] Field of Search ............... 260/152, 157, 158, 162, 260/163, 207, 207.1; 534/630, 643, 640, 770, 774, 788, 791, 794, 795

[56] References Cited

U.S. PATENT DOCUMENTS

| | | | |
|---|---|---|---|
| 2,373,700 | 4/1945 | McNally et al. | 260/207.1 |
| 3,097,198 | 7/1963 | Fishwick et al. | 260/207.1 |
| 4,087,420 | 5/1978 | Heinrich et al. | 260/158 X |
| 4,271,071 | 6/1981 | Clark | 260/157 |

FOREIGN PATENT DOCUMENTS

| | | | |
|---|---|---|---|
| 2028457 | 12/1970 | Fed. Rep. of Germany | 260/158 |
| 2718636 | 11/1978 | Fed. Rep. of Germany | 260/207.1 |

*Primary Examiner*—Floyd D. Higel
*Attorney, Agent, or Firm*—Oblon, Fisher, Spivak, McClelland & Maier

[57] ABSTRACT

Monoazo dyes for dyeing polyester fibers represented by the formula:

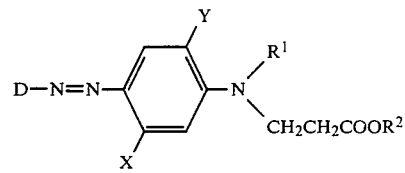

wherein D represents a substituted or unsubstituted thiazolyl, benzothiazolyl, thiadiazolyl or pyridyl group, X represents a hydrogen atom, a chlorine atom, a methyl group, a methoxy group or an acylamino group, Y represents a hydrogen atom, a chlorine atom, a methyl group, an alkoxy group or an alkoxyalkyl group, $R^1$ represents a hydrogen atom, a substituted or unsubstituted alkyl, alkenyl or aryl group, and $R^2$ represents a phenoxymethyl group, a phenoxyethyl group, a benzyl group or a tetrahydrofurfuryl group.

Fibers which can be dyed with the azo dyes of the present invention include polyester fibers such as polyethylene terephthalate, a polycondensate between terephthalic acid and 1,4-bis (hydroxymethyl) cyclohexane or the like and blended or mixed fibers of the above-described polyester fibers with natural fibers such as cotton, silk or wool. The present dyes can also be used in combination with other dyes of the same series. In some cases, blending two or more dyes represented by the general formula (I) provides good results as well as an improvement of the dyeing properties.

7 Claims, No Drawings

HETEROCYCLIC MONOAZO DYES FOR POLYESTER FIBERS

BACKGROUND OF THE INVENTION

Field of the Invention

This invention relates to monoazo dyes for polyester fibers and, more particularly, to azo dyes which can dye polyester fibers red to bluish green with excellent fastness properties, particularly fastness to light, fastness to sublimation, and fastness to water and excellent alkali discharge resistance.

Summary of the Invention

The dyes in accordance with the present invention are water-insoluble azo dyes represented by the formula (I):

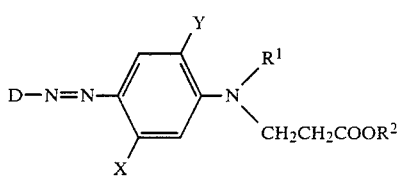

wherein D represents a substituted or unsubstituted thiazolyl, benzothiazolyl, thiadiazolyl or pyridyl group, X represents a hydrogen atom, a chlorine atom, a methyl group, a methoxy group or an acylamino group, Y represents a hydrogen atom, a chlorine atom, a methyl group, an alkoxy group or an alkoxyalkyl group, $R^1$ represents a hydrogen atom, a substituted or unsubstituted alkyl, alkenyl or aryl group, and $R^2$ represents a phenoxymethyl group, a phenoxyethyl group, a benzyl group or a tetrahydrofurfuryl group.

DETAILED DESCRIPTION OF THE INVENTION

Examples of the substituted or unsubstituted thiazolyl, benzothiazolyl and pyridyl group for D include a thiazolyl group; a benzothiazolyl group; a thiazolyl or benzothiazolyl group substituted with a methyl group, a chlorine atom, a bromine atom, a nitro group, a lower alkoxycarbonyl group, a methoxycarbonyl group, an ethoxycarbonyl group, a trifluoromethyl group, a methylsulfonyl group, a formyl group, a $\beta,\beta$-dicyanovinyl group, a $\beta$-cyano-$\beta$-alkoxycarbonylvinyl group or the like; a thiadiazolyl group; a thiadiazolyl group substituted with a lower alkyl group, a phenyl group, a benzyl group, a phenethyl group, a cycloalkyl group, a lower alkylthio group, a lower alkylsulfinyl group, a lower alkylsulfonyl group, a cyano group, a chlorine atom, an arylthio group, an arylsulfinyl group, an arylsulfonyl group or the like; a pyridyl group; and a pyridyl group substituted with a chlorine atom, a bromine atom, a nitro group, a methyl group, a methylsulfonyl group, a cyano group or the like.

Examples of the acylamino group in X include an acetylamino group, a chloroacetylamino group, a benzoylamino group, a methylsulfonylamino group, a chloropropionylamino group, an ethoxycarbonylamino group, an ethylaminocarbonylamino group, and the like.

Examples of the alkoxy group in Y include a methoxy group, an ethoxy group, etc.

Examples of the alkoxyalkyl group in Y include a methoxymethyl group, an ethoxyethyl group, etc.

The unsubstituted alkyl group in $R^1$ includes a methyl group, an ethyl group, a straight or branched chain propyl, butyl, pentyl, hexyl, heptyl or octyl group, etc.

Examples of the substituted alkyl group in $R^1$ include a lower alkoxyalkyl group (e.g., a methoxyethyl group, an ethoxyethyl group, a butoxyethyl group, etc.); a lower alkoxyalkoxyalkyl group (e.g., a methoxyethoxyethyl group, an ethoxyethoxyethyl group, etc.); a phenoxyalkyl group (e.g., a phenoxyethyl group, etc.); an aralkyloxy lower alkyl group which may be substituted (e.g., a benzyloxyethyl group, a chlorobenzyloxyethyl group, etc.); a hydroxyalkyl group which may be substituted (e.g., a hydroxyethyl group, a hydroxypropyl group, a hydroxybutyl group, a hydroxyhexyl group, a 2-hydroxy-3-methoxypropyl group, etc.); a cyano lower alkyl group (e.g., a cyanomethyl group, a cyanoethyl group, etc.); an acyloxy lower alkyl group which may be substituted (e.g., an acetyloxyethyl group, a chloroacetyloxyethyl group, a chloropropionyloxyethyl group, a benzoyloxyethyl group, etc.); an alkoxycarbonyloxy lower alkyl group (e.g., a methoxycarbonyloxyethyl group, a methoxyethoxycarbonylethyl group, etc.); a carbamoyl lower alkyl group (e.g., a carbamoylmethyl group, a carbamoylethyl group, etc.); an alkoxycarbonyl lower alkyl group which may be substituted (e.g., a methoxycarbonylmethyl group, an ethoxycarbonylmethyl group, a methoxycarbonylethyl group, an ethoxycarbonylethyl group, a methoxycarbonylpropyl group, an ethoxycarbonylpropyl group, a methoxyethoxycarbonylmethyl group, a benzyloxycarbonylmethyl group, etc.); an aralkyl group which may be substituted (e.g., a benzyl group, a phenethyl group, a chlorobenzyl group, etc.); an allyloxycarbonyl lower alkyl group (e.g., an allyloxycarbonylethyl group, an allyloxycarbonylmethyl group, etc.); a tetrahydrofurfuryl group; a succinimido lower alkyl group (e.g., a succinimidoethyl group, etc.); a phthalimido lower alkyl group (e.g., a phthalimidoethyl group, etc.); a cyanoalkoxy lower alkyl group (e.g., a cyanoethoxyethyl group, a cyanomethoxyethyl group, etc.); and a halogenated lower alkyl group (e.g., a chloroethyl group, etc.).

Examples of the alkenyl group in $R^1$ include an allyl group, a crotyl group, etc.

Examples of the aryl group in $R^1$ include a phenyl group, a chlorophenyl group, a tolyl group, etc.

The monoazo dyes represented by the formula (I) can be produced by diazotizing an amine represented by the formula (II):

wherein D is the same as defined hereinbefore, and coupling the resulting product with a compound represented by the formula (III):

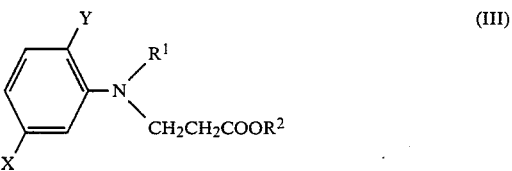

wherein X, Y, $R^1$ and $R^2$ are the same as defined hereinbefore.

Fibers which can be dyed with the azo dyes of the present invention include polyester fibers comprising polyethylene terephthalate, a polycondensate between terephthalic acid and 1,4-bis(hydroxymethyl)cyclohexane, or the like and blended or mixed fibers of the abovedescribed polyester fibers with natural fibers such as cotton, silk or wool.

In dyeing polyester fibers using the dye of the present invention, a dye-bath or a printing paste is prepared by dispersing the dye represented by the formula (I) in an aqueous medium in a conventional manner using a dispersing agent such as a condensate between naphthalenesulfonic acid and formaldehyde, a higher alcohol sulfuric ester or a higher alkylbenzenesulfonate, since the dye is water-insoluble or sparingly soluble, and dip-dyeing or printing is conducted using the thus prepared dye-bath or printing paste. For example, in the case of dip-dyeing, polyester fibers or the blended fibers thereof can be dyed with good fastness by employing a conventional dyeing process such as high-temperature dyeing process, carrier dyeing process or thermosol dyeing process. In this case, addition of an acidic substance such as formic acid, acetic acid, phosphoric acid or ammonium sulfate to the dye-bath in some cases provides better results.

The dye represented by the formula (I) of the present invention may be used in combination with the same or different series dye. In some cases, blending two or more dyes represented by the foregoing general formula (I) provides good results such as improvement of dyeing properties.

The present invention will now be described in more detail by reference to the following examples of preferred embodiments of the present invention. However, the present invention is not limited thereto. Unless otherwise indicated, all percents, parts, ratios and the like are by weight.

EXAMPLE 1

0.5 g of the dye represented by the structural formula:

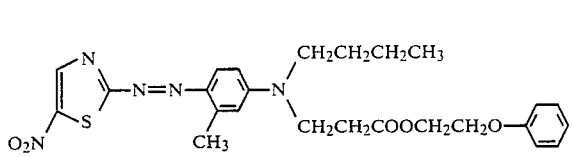

was dispersed in 3 liters of water containing 1 g of a naphthalenesulfonic acid-formaldehyde condensate and 2 g of higher alcohol sulfuric ester to prepare a dye-bath. 100 g of polyester fibers were dipped in this dye-bath at 130° C. for 60 minutes to dye, followed by soaping, washing with water, and drying. Cloth sample dyed clear blue was obtained. This dyed cloth showed good fastness to light, sublimation and water, and the dye showed good temperature stability and pH stability upon dyeing.

The dye used in this Example was prepared as follows.

8.7 g of 2-amino-5-nitrothiazole was dissolved in 18 ml of acetic acid, and diazotization was conducted at −3° C. using 42% nitrosylsulfuric acid. The resulting diazonium salt solution was added, at 0° C., to a solution of 81.3 g of N-butyl-N-phenoxyethoxycarbonylethyl-m-toluidine in 250 ml of methanol, and a precipitated dye was collected by filtration, washed with water, and dried. This product had a λmax (acetone) of 603 nm.

EXAMPLE 2

0.5 g of the dye represented by the structural formula:

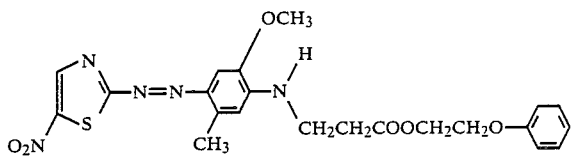

was mixed with 3 g of a naphthalenesulfonic acid-formaldehyde condensate and 4 g of water, and the resulting mixture was ground for 10 hours using a sand grinder. The thus obtained dye dispersion and 2 g of a carrier (Meiprinter Y-25 (trade name); made by Meisei Chemical Industries Ltd.) were mixed into 90 g of a printing paste to prepare a dye paste.

This dye paste was applied onto a polyester fiber material and, after intermediate drying at 100° C. for 2 minutes, steamed at 170° C. for 7 minutes to fix the dye, followed by soaping, washing with water, and drying. Cloth sample dyed clear blue with good fastness to light and sublimation was obtained.

The product had a λmax (acetone) of 607 nm.

EXAMPLE 3

Polyester fibers were dyed in the same manner as in Example 1 except for using the dye represented by the structural formula:

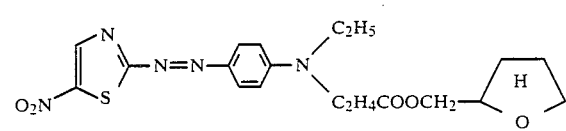

to obtain a cloth sample dyed clear reddish blue. The thus dyed cloth showed good fastness to light, sublimation and water, and the above-described dye showed good temperature dependence and pH stability upon dyeing.

The dye used in this Example was prepared according to Example 1.

The product had a λmax (acetone) of 587 nm.

EXAMPLE 4

Polyester fibers were dyed in the same manner as in Example 1 except for using dyes shown in Table 1 below to obtain dyed products of color tones also shown in the table.

TABLE $$D-N=N-\underset{\underset{X}{\overset{Y}{\bigcirc}}}{}-N\underset{CH_2CH_2COOR^2}{\overset{R^1}{}}$$

| Run No. | D | —X | —Y | —R¹ | —R² | Dyed Color Tone (Polyester Fibers) | λmax (Acetone nm) |
|---|---|---|---|---|---|---|---|
| 1 | $O_2N$-thiazole-CH₃ | —H | —H | —C₂H₅ | —C₂H₄O—C₆H₅ | reddish blue | 589 |
| 2 | " | " | " | —C₄H₉ | —CH₂O—C₆H₅ | reddish blue | 587 |
| 3 | " | —CH₃ | " | —CH₃ | —C₂H₄O—C₆H₅ | reddish blue | 602 |
| 4 | " | " | " | —C₂H₅ | —C₂H₄O—C₆H₅ | blue | 603 |
| 5 | " | " | —OCH₃ | —H | —CH₂-(tetrahydrofuryl) | " | 607 |
| 6 | " | " | —H | —CH₂—CH=CH₂ | —C₂H₄O—C₆H₅ | blue | 602 |
| 7 | " | —H | " | —C₂H₄O—C₆H₅ | " | reddish blue | 587 |
| 8 | " | —NHCOCH₃ | " | —C₄H₉ | " | blue | 596 |
| 9 | Br-thiazole-CH₃ | —H | " | " | " | red | 511 |
| 10 | CH₃OOC, CH₃-thiazole-CH₃ | —CH₃ | " | " | " | reddish blue | 585 |
| 11 | CH₃-thiazole-CH₃ | " | " | " | " | violet | 575 |
| 12 | Cl, OHC-thiazole-CH₃ | " | " | " | " | reddish blue | 591 |
| 13 | Cl, NC/C₄H₉OOC-C=CH-thiazole-CH₃ | " | " | " | " | greenish blue | 646 |
| 14 | benzothiazole-CH₃ | " | " | —CH₂—CH=CH₂ | " | reddish blue | 589 |

TABLE-continued $$D-N=N-\underset{\underset{X}{\bigcirc}}{\overset{Y}{\bigcirc}}-N\underset{CH_2CH_2COOR^2}{\overset{R^1}{<}}$$

| Run No. | D | −X | −Y | −R¹ | −R² | Dyed Color Tone (Polyester Fibers) | λmax (Acetone nm) |
|---|---|---|---|---|---|---|---|
| 15 | 2-methyl-6-methylbenzothiazole | " | " | −C₂H₄OCH₃ | " | violet | 577 |
| 16 | 2-methyl-6-nitrobenzothiazole | " | " | −C₂H₄CN | " | bluish red | 545 |
| 17 | 1,2,4-thiadiazole with H₃CS and isopropyl | −NHCOCH₃ | " | −C₄H₉ | −CH₂O−Ph | " | 525 |
| 18 | 1,2,4-thiadiazole with (n)H₉C₄OS and isopropyl | −Cl | " | −C₂H₅ | −C₂H₄O−Ph | " | 523 |
| 19 | 1,2,4-thiadiazole with (n)H₉C₄O₂S and isopropyl | " | " | " | " | " | 534 |
| 20 | 1,2,4-thiadiazole with PhCH₂S and isopropyl | −NHCOCH₃ | " | −C₂H₄OCH₃ | " | " | 521 |
| 21 | 1,2,4-thiadiazole with O₂N-Ph-S and isopropyl | " | " | −CH₂−CH=CH₂ | " | " | 540 |
| 22 | 3-pyridyl | −CH₃ | " | −C₂H₅ | " | " | 521 |
| 23 | " | −H | " | " | " | red | 516 |
| 24 | " | −NHCOCH₃ | " | " | −CH(tetrahydrofuryl) | bluish red | 530 |
| 25 | 2,6-dichloropyridyl | " | " | " | " | violet | 555 |
| 26 | 2-methyl-5-nitrothiazole | −CH₃ | −CH₃ | −H | −C₂H₄O−Ph | blue | 603 |
| 27 | " | −OCH₃ | −OCH₃ | " | " | " | 610 |

TABLE-continued

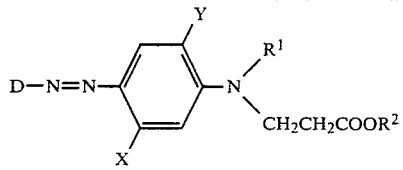

| Run No. | D | —X | —Y | —R¹ | —R² | Dyed Color Tone (Polyester Fibers) | λmax (Acetone nm) |
|---|---|---|---|---|---|---|---|
| 28 | " | —CH₃ | —H | —C₂H₅ | —CH₂—<phenyl> | " | 602 |

While the invention has been described in detail and with reference to specific embodiments thereof, it will be apparent to one skilled in the art that various changes and modifications can be made therein without departing from the spirit and scope thereof.

What is claimed is:

1. A monoazo dye of the formula:

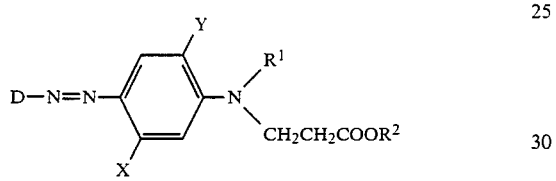

wherein

D is selected from the group consisting of unsubstituted thiazolyl, unsubstituted benzothiazolyl, unsubstituted thiadiazolyl, unsubstituted pyridyl, unsubstituted thiazolyl, benzothiazolyl substituted with methyl, chlorine, bromine, nitro, $C_1$–$C_8$ alkoxycarbonyl, methoxycarbonyl, ethoxycarbonyl, trifluoromethyl, methylsulfonyl, formyl, b,b-dicyanovinyl or b-cyano-b-alkoxycarbonylvinyl, thiadiazolyl substituted with $C_1$–$C_8$ alkyl, phenyl, benzyl, phenethyl, cycloalkyl, $C_1$–$C_8$ alkylthio, $C_1$–$C_8$ alkylsulfinyl, $C_1$–$C_8$ alkylsulfonyl, cyano, chlorine, arylthio, arylsulfinyl, or arylsulfonyl, and pyridyl substituted with chlorine, bromine, nitro, methyl, methylsulfonyl, or cyano;

X is selected from the group consisting of H, Cl, CH₃, OCH₃, and acylamino selected from the group consisting of acetylamino, chloroacetylamino, benzoylamino, methylsulfonylamino, chloropropionylamino, ethoxycarbonylamino, and ethylaminocarbonylamino;

Y is selected from the group consisting of H, Cl, CH₃, alkoxyl selected from the group consisting of CH₃O and CH₃CH₂O, and alkoxyalkyl selected from the group consisting of methoxymethyl and ethoxyethyl, R¹ is selected from the group consisting of branched or unbranched $C_1$–$C_8$ alkyl; alkoxyalkyl selected from the group consisting of methoxyethyl, ethoxyethyl, and butoxyethyl; alkoxyalkoxyalkyl selected from the group consisting of methoxyethoxyethyl and ethoxyethoxyethyl; phenoxyethyl; aralkyloxy ($C_1$–$C_8$) alkyl which may be unsubstituted or substituted with chlorine, hydroxyalkyl selected from the group consisting of hydroxyethyl, hydroxypropyl, hydroxybutyl, hydroxyhexyl and 2-hydroxy-3-methoxypropyl; cyano($C_1$–$C_2$)alkyl, acyloxyalkyl selected from acetyloxyethyl, chloroacetyloxyethyl, chloropropionyloxyethyl and benzoyloxyethyl; alkoxycarbonyloxy alkyl selected from the group consisting of methoxycarbonyloxyethyl and methoxyethoxycarbonylethyl; carbamoyl($C_1$–$C_2$)alkyl; alkoxycarbonyl alkyl selected from the group consisting of methoxycarbonylmethyl, ethoxycarbonylmethyl, methoxycarbonylethyl, ethoxycarbonylethyl, methoxycarbonylpropyl, ethoxycarbonylpropyl, methoxyethoxycarbonylmethyl and benzyloxycarbonylmethyl; aralkyl selected from the group consisting of benzyl, phenethyl and chlorobenzyl; allyloxycarbonyl($C_1$–$C_2$)alkyl; tetrahydrofurfuryl; succinimido ethyl, phthalimido ethyl, cyanoalkoxyalkyl selected from the group consisting of cyanoethoxyethyl and cyanomethoxyethyl; chloroethyl, alkenyl selected from the group consisting of allyl and crotyl; and aryl selected from the group consisting of phenyl, chlorophenyl and tolyl; and R² is selected from the group consisting of phenoxymethyl, phenoxyethyl, benzyl and tetrahydrofurfuryl.

2. The monoazo dye of claim 1 wherein

D is

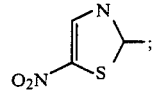

X and Y, independent of each other, are selected from the group consisting of H, —CH₃, —OCH₃ and —NHCOCH₃;

R¹ is selected from the group consisting of H, —CH₃, —C₂H₅, —C₄H₉, —CH₂—CH=CH₂ and

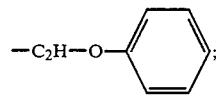

and R² is selected from the group consisting of

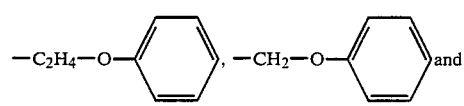

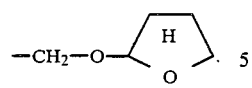

3. The monoazo dye of claim 1 wherein:
D is

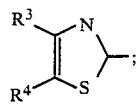

wherein $R^3$ and $R^4$, independent of each other, are selected from the group consisting of chlorine, bromine, —$CH_3$, —H, $CH_3COO$—, —CHO, and $C_4H_9COO$—$C(CN)$=CH;
X and Y, independent of each other, are selected from the group consisting of H and —$CH_3$;
$R^1$ is $C_4H_9$; and
$R^2$ is

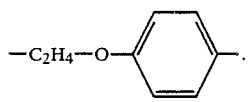

4. The monoazo dye of claim 1 wherein:
D is

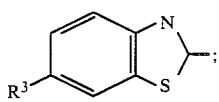

wherein $R^3$ is selected from the group consisting of H, —$CH_3$ and —$NO_2$;
X is —$CH_3$;
Y is —H;
$R^1$ is selected from the group consisting of —$C_2H_4CN$, —$C_2H_4OCH_3$ and —$CH_2$—CH=$CH_2$; and
$R^2$ is

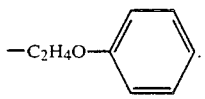

5. The monoazo dye of claim 1 wherein:
D is

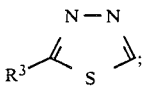

wherein $R_3$ is selected from the group consisting of —$SCH_3$, —$SOC_4H_9$, —$SO_2C_4H_9$ and

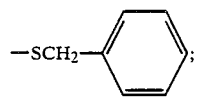

X is selected from the group consisting of Cl and —$NHCOCH_3$;
Y is H;
$R^1$ is selected from the group consisting of —$C_2H_5$, —$C_4H_9$, —$C_2H_4OCH_3$ and —$CH_2CH$=$CH_2$; and
$R^3$ is selected from the group consisting of

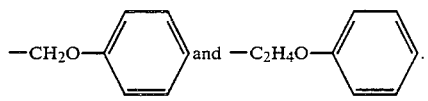

6. The monoazo dye of claim 1 wherein:
D is

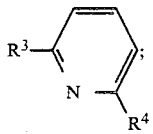

wherein $R_3$ and $R_4$ are selected from the group consisting of H or Cl;
X is selected from the group consisting of H, —$CH_3$ and —$NHCOCH_3$;
Y is H;
$R^1$ is —$C_2H_5$; and
$R^2$ is selected from the group consisting of

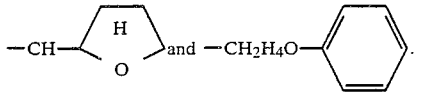

7. The monoazo dye of claim 1 wherein:
D is

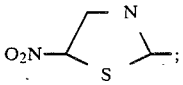

X and Y independent of each other are H, —$CH_3$— or $OCH_3$;
$R^1$ is selected from the group consisting of H and —$C_2H_5$—; and
$R^2$ is selected from the group consisting of

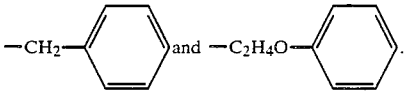

* * * * *